United States Patent
Cangiani et al.

(10) Patent No.: US 7,616,678 B2
(45) Date of Patent: Nov. 10, 2009

(54) MULTI-CARRIER CONSTANT ENVELOPE SIGNAL SCHEME FOR POWER AND BANDWIDTH EFFICIENT COMMUNICATIONS

(75) Inventors: Gene L. Cangiani, Parsippany, NJ (US); Stephen Stoyanov, Lodi, NJ (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 600 days.

(21) Appl. No.: 11/449,856

(22) Filed: Jun. 9, 2006

(65) Prior Publication Data
US 2006/0291538 A1   Dec. 28, 2006

Related U.S. Application Data

(60) Provisional application No. 60/688,903, filed on Jun. 9, 2005.

(51) Int. Cl.
*H04B 1/69* (2006.01)
*H04B 1/707* (2006.01)
*H04B 1/713* (2006.01)

(52) U.S. Cl. .................. 375/146; 375/130; 375/260; 375/135; 375/261; 375/296; 370/335

(58) Field of Classification Search .............. 375/130, 375/260, 135, 146, 261, 296, 298; 370/335
See application file for complete search history.

(56) References Cited

U.S. PATENT DOCUMENTS

| | | | |
|---|---|---|---|
| 6,996,080 B1 * | 2/2006 | Orr | 370/335 |
| 7,035,245 B2 | 4/2006 | Orr et al. | |
| 7,505,506 B1 * | 3/2009 | Djuknic et al. | 375/130 |
| 2002/0075907 A1 | 6/2002 | Cangiani et al. | |

* cited by examiner

*Primary Examiner*—Phuong Phu
(74) *Attorney, Agent, or Firm*—Edell, Shapiro & Finnan, LLC

(57) ABSTRACT

A technique for combining a plurality of signals to form a multi-carrier constant-envelope composite signal includes generating a constant-amplitude inphase (I) composite signal based on a majority vote of a first set of signals and generating a constant-amplitude quadrature (Q) composite signal based on a separate majority vote of a second set of signals. The I and Q components of a carrier signal are respectively modulated with the I and Q composite signals and combined to form the constant-envelope composite signal. In the case where a single offset carrier code is a constituent of the constant-envelope composite signal, a scale factor is applied to one of the I and Q composite signals to equalize the power of the I and Q components of the offset carrier code.

30 Claims, 4 Drawing Sheets

MULTI-CARRIER CONSTANT ENVELOPE SIGNAL SCHEME FOR POWER AND BANDWIDTH EFFICIENT COMMUNICATIONS

CROSS REFERENCE TO RELATED APPLICATION

This application claims priority from U.S. Provisional Patent Application Ser. No. 60/688,903 entitled "A Multi-Carrier Constant Envelope Signal Structure for Power Efficient, Bandwidth Efficient Communications," filed Jun. 9, 2005. The disclosure of this provisional patent application is incorporated herein by reference in its entirety.

BACKGROUND

The most prevalent signal structure for multi-carrier signal structures is Orthogonal Frequency Division Multiplex (OFDM), especially for new Wireless Fidelity (WiFi) and WiMAX applications. In OFDM, a data stream is converted from serial to parallel and each of the parallel data channels modulates a separate RF carrier, resulting in a relatively wide effective bandwidth and its attendant robustness to channel fades. The frequency spacing between the individual carriers is set equal to the data rate, such that each carrier coincides with nulls of all of the other carriers, thereby reducing inter-symbol interference. The OFDM composite signal is readily generated with the Inverse Fast Fourier Transform (IFFT), obviating the need to synthesize each of the RF carriers, and can be similarly demodulated at the receiver using the corresponding Fast Fourier Transform (FFT). This ease of use has been a major factor in the widespread use of OFDM.

Conventional methods of utilizing multi-carrier waveforms, such as the various forms of OFDM, do not result in constant envelope composite signals. Non-linearities in the power amplifiers used to transmit these signals result in signal distortions and performance degradation. As a result, current implementations use expensive, highly linear amplifiers in order to minimize these distortions, and the power is backed off considerably in order to maintain operation in the linear range, resulting in very poor power efficiency. Much of the ongoing research in this area is concerned with reducing the crest factor in the composite waveform and with development of adaptive pre-distortion techniques in order to mitigate the effect of amplifier non-linearities.

SUMMARY OF THE INVENTION

A technique for combining a plurality of signals to form a constant-envelope composite signal includes generating a constant-amplitude inphase (I) composite signal based on a majority vote of a first set of signals and generating a constant-amplitude quadrature (Q) composite signal based on a separate majority vote of a second set of signals. The I and Q components of a carrier signal are respectively modulated with the I and Q composite signals and combined to form the constant-envelope composite signal. The signals to be combined can be chip-synchronous, pseudo-noise signal codes, wherein values of the I and Q composite signals are determined on a chip-by-chip basis from respective weighted majority votes.

In general, each of the majority voting operations can be performed using known majority voting schemes. For example, in each of the I and Q channels, the majority vote can be performed using the chip values of the codes, which have been weighted in accordance with a commanded power distribution among the codes. Likewise, various interlacing schemes can be employed in the majority voting logic.

The constant-envelope composite signal can be a multi-carrier constant envelope (MCCE) signal. For example, a number of codes can be transmitted at a main carrier frequency $f_C$ along with one or more codes transmitted on a single offset carrier $f_C - f_S$ that is offset from the main carrier frequency. To preserve the constant-envelope of the composite signal, a scale factor is applied to one of the I and Q composite signals to equalize the power of the I and Q components of the offset carrier code. The scale factor causes the amplitudes of the I and Q composite signals to differ; however, each of the I and Q composite codes remains a constant-amplitude signal as does the overall composite signal.

The offset carrier code can itself be a composite code generated by combining a plurality of offset carrier codes via a majority vote. In this case, a plurality of codes can be transmitted on the same offset carrier within the composite signal. Another approach to transmitting plural codes on the same offset carrier is to modulate the offset carrier with two different codes at orthogonal phases. Further, multiple codes can be transmitted on multiple carriers within the constant-envelope composite signal by combining a plurality of offset carrier codes at a plurality of offset carrier frequencies with main carrier codes.

The MCCE technique of the invention can be used in a wide variety of communication and navigation applications that transmit signals on multiple carriers or frequency channels, including but not limited to: code division multiple access (CDMA) based systems such as multi-carrier CDMA used in cellular base stations; WiFi and WiMAX communications; terrestrial, airborne, and satellite-based systems; and satellite navigation systems such as the GPS and Galileo systems.

The above and still further features and advantages of the present invention will become apparent upon consideration of the following definitions, descriptions and descriptive figures of specific embodiments thereof wherein like reference numerals in the various figures are utilized to designate like components. While these descriptions go into specific details of the invention, it should be understood that variations may and do exist and would be apparent to those skilled in the art based on the descriptions herein.

DETAILED DESCRIPTION

Figure 1:
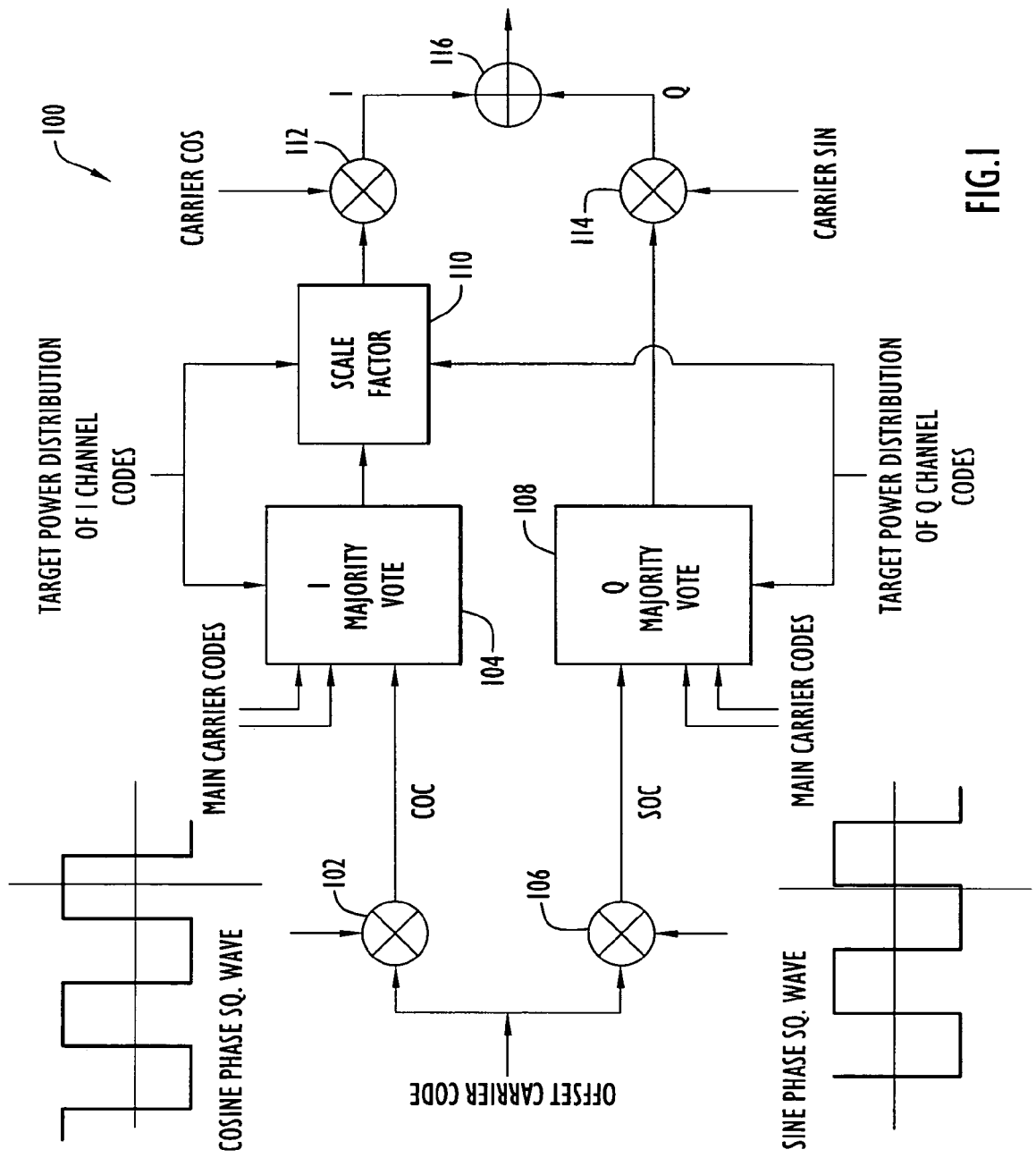
FIG. 1 is a functional block diagram of a modulation scheme for combining an offset carrier code modulated on a single offset carrier with main carrier codes into a constant-envelope composite signal in accordance with an exemplary embodiment of the present invention.

The following detailed explanations of FIGS. 1-4 and of the exemplary embodiments reveal the methods and apparatus of the present invention. The invention provides the ability to achieve the benefits of multi-carrier communications while maintaining a constant envelope composite signal. Applications that utilize several distinct RF carriers within their allocated bandwidth to transmit groups of CDMA signals without any special (orthogonal) relationship among the carriers, such as cellular base stations, typically utilize separate transmit chains for each carrier. This invention enables all of these carriers to be accommodated with a single amplifier and antenna, reducing cost, power, size, and weight of the equipment and provides the added benefit of a constant envelope signal, allowing the use of inexpensive, highly efficient saturated amplifiers. For these applications, the described Multi-Carrier Constant Envelope (MCCE) technique is completely backward compatible in that a base station can make the transition to MCCE without affecting any users. The change would be completely transparent to existing users of the service.

For applications that are currently using OFDM, the signal structure currently in wide commercial use is not compatible with MCCE, and a transition to MCCE would require retrofit of all of the user equipment. However, new WiFi applications are emerging, and MCCE can lower equipment costs, reduce operating expenses, and improve bandwidth efficiency for these new applications. Further, there is a version of OFDM for multi-user applications that is totally compatible with MCCE, since the signal structure calls for a separate CDMA signal on each orthogonal carrier. This version of OFDM is mentioned in the literature, as a form of Multi-Carrier CDMA, but is not currently in widespread use. MCCE brings all of the benefits of constant envelope signaling to this signal structure and has the potential to become the modulation methodology of choice for multi-user CDMA communications.

The MCCE technique involves combining a plurality of PN codes via majority voting logic, wherein separate majority voting operations are performed on the inphase (I) and quadrature (Q) channels prior to combining and amplification, such that both the I and Q channels individually have constant envelope signals. Majority voting logic is described in published patent documents and has been described in the open literature; however, the utilization of majority voting logic within the MCCE scheme is unique. Several majority voting logic schemes, specifically, weighted majority voting logic, are described for example in commonly assigned U.S. Patent Application Publication No. 2002/0075907 to Cangiani et al. and U.S. Pat. No. 7,035,245 to Orr et al., the disclosures of which are hereby incorporated by reference in their entireties.

In the context of combining a plurality of direct sequence spread spectrum pseudo-noise (PN) codes, simple majority voting essentially involves assessing at each chip interval the value of the chip of each PN code being combined, and generating a single value (logical 0 or 1) that reflects the value of the majority of chips (this requires the combining of an odd number of codes to prevent ties). For example, in combining three equally-weighted PN codes into a composite signal, if two of the three chip have a logical "1" value and only one of the three chips has a logical "0" value, then the composite signal is set to a logical "1" value to reflect the majority. Note that, when combining PN spreading codes, the voting occurs on a chip-by-chip basis, and there is generally a significant number of chips per each bit of information. Consequently, while individual chips of the combined, composite signal will be incorrect relative to some of the corresponding chips of each of the original constituent chip sequences, over the span of an entire bit, most of the chips of the combined signal will accurately reflect the corresponding chips of each of the original constituent sequences, allowing the information bit to be detected and correctly determined by a receiver with only a modest degree of signal degradation. Since communication signals are received in the presence of noise and other transmission anomalies, application of majority voting amounts to imposing a measure of power control over the various constituent PN codes, and majority voting merely results in a tolerable multiplexing power loss in each signal channel.

As described in the aforementioned patent documents, the desired power levels of the constituent PN codes to be combined via majority voting logic may, in general, be different and may vary over time. For example, CDMA systems frequently assess channel conditions such as interference, multipath losses, and range between the transmitter and each receiver in order to adjust the power required to successfully transmit signals to each user. This assessment results in a power distribution assignment which allocates a fraction of the available transmit power to each of the constituent signals to be combined into the composite signal. The power distribution can be realized by employing a weighted majority voting logic scheme in which the "vote" of each constituent PN code is weighted according to the desired power ratio of that code. For example, each time the power distribution among the constituent PN codes changes, the majority voting module is supplied a set of target gains that respectively correspond to the desired power of the individual PN codes. The majority voting module translates this target power distribution into a weighted voting scheme. The weights placed on each code's chip values can be computed, for example, using the equations described in the aforementioned patent documents. As described therein, to accurately reflect the power distributions involving substantially different power levels among the constituent PN codes, more involved weighting schemes can be used to avoid suppression of lower-power signals, such as interleaving or interlacing of chips associated with subsets of the constituent PN codes. Any of the various majority voting logic schemes described in the aforementioned patent documents and in the open literature can be used in the context of the MCCE technique of the present invention.

To illustrate the principles of the MCCE technique of the present invention, the concept is described in the context of a particular application. Specifically, a simple application of this technology involves generating a single offset carrier modulated by a single pseudo-noise (PN) spreading code and combining the single offset carrier with other PN codes in a constant-envelope composite signal for transmission. It will be appreciated, however, that the invention is not limited to applications involving single offset carriers or any particular number of PN codes.

In the frequency domain, an offset carrier code has a main lobe that is offset from the main RF carrier frequency $f_c$. An offset carrier code can be generated, for example, by multiplying a conventional PN code by a square wave of frequency $f_s$ before modulation of the main carrier $f_c$, resulting sidelobe signals at two offset frequencies, namely, the sum and difference frequencies $(f_c+f_s)$ and $(f_c-f_s)$. This technique, Binary Offset Carrier (BOC), was developed for the Global Positioning System (GPS) and will be implemented in the next generation of GPS satellites. The BOC code can be treated as any other code, and all of the composite codes can be combined to generate a constant envelope composite signal, using Interplex Modulation, Majority Vote combining, or Intervote Modulation. An advantage of using an offset carrier generated in this manner is that a single amplifier and transmitter can be used to transmit signals at two or more separate frequencies, with different codes on each frequency. For example one or more PN codes can be transmitted on the main carrier frequency $f_C$ (main carrier codes), while one or more different PN codes can be transmitted on an offset carrier frequency $f_C$–$f_S$ (offset carrier codes) by combining the main carrier code(s) and the offset carrier code(s) and modulating the RF carrier $f_C$ with the combined codes. It would be preferable to accomplish this while maintaining a constant envelope on the overall composite signal so that a saturated amplifier can be used.

The basic BOC technique results in two offsets at frequencies ($f_c$+$f_s$) and ($f_c$–$f_s$). If only one of the two offset frequencies is desired, say ($f_c$–$f_s$), filtering can be used to eliminate the other, undesired offset frequency. This single offset carrier approach is being implemented, for example, in the Galileo satellite navigation system. However, if filtering is used to eliminate the undesired offset before amplification, the filter destroys the constant envelope characteristic of the signal. If the filtering is performed after amplification, half of the total power output has been wasted in the extraneous offset. Neither of these options is desirable.

A method for generating a single offset carrier by applying a separate BOC-type signal to the inphase (I) and quadrature (Q) components of the main carrier has been published in the open literature. The individual BOC signals are phased such that the offsets on one side of the carrier reinforce, while the offsets on the opposite side cancel each other. Essentially, this can be accomplished by applying a sine phase square wave to either the inphase or quadrature component and a cosine phase of the same square wave frequency to the other component (i.e., the PN code is multiplied by two versions of the square wave, one with the cosine phase and the other with the sine phase). Upon combining the I and Q phases of the RF signal, one of the two carrier offset sidelobes cancels out, leaving the single offset carrier signal. However, this cancellation occurs only if the amplitude of the offset carrier code in the I channel is the same as the amplitude of the offset carrier code in the Q channel. Since techniques for combining a plurality of PN codes do not, in general, preserve an equal amplitude of the I and Q components of offset carrier codes, it has not previously been possible to combine a single offset signal with other PN codes while maintaining a constant envelope composite signal.

The multi-carrier constant envelope (MCCE) technique of the invention provides a way to combine a single offset carrier signal with other PN codes while preserving a constant-envelope composite signal by separately performing majority voting logic on codes being combined on the I channel and codes being combined on the Q channel. The majority voting process will not, in general, result in the I and Q components of the offset carrier signal having the same amplitude. Thus, to ensure that the I and Q components of the offset carrier signal properly cancel the second offset carrier sidelobe, a scale factor is applied to at least one of the I and Q channels to adjust the I and Q components of the offset carrier signal to the same magnitude.

Application of MCCE to this simple case is illustrated in FIG. 1, wherein separate majority vote logic algorithms are implemented for the inphase (I) and quadrature (Q) channels of the main carrier in a modulator 100 designed to combine a plurality of PN codes into a constant-envelope composite signal. As shown in FIG. 1, a PN code to be transmitted via a single offset carrier (offset carrier code) is multiplied by the cosine phase of a square wave of frequency $f_S$ via multiplier 102 to produce a cosine offset carrier code (COC) which is supplied to an I channel majority vote module 104. The offset carrier code is separately multiplied by the sine phase of the square wave via multiplier 106 to produce a sine offset carrier code (SOC) which is supplied to a Q channel majority vote module 108. As previously noted, if the amplitudes of the cosine offset carrier and sine offset carrier remain equal, upon combining the modulated I channel carrier and the modulated Q channel carrier, one of the two offset sidelobes is canceled, leaving a single offset carrier signal for transmission. As used herein, the term module refers to any hardware or software implementation (or combinations thereof) that can be used to perform the described operation and does not necessarily imply a separate physical unit or structure or any particular circuit arrangement.

The I channel majority vote module 104 also receives I channel main carrier codes to be combined with the cosine offset carrier code. These additional codes are referred to as main carrier codes because these signals will be transmitted at the main carrier frequency $f_C$, rather than at an the offset carrier frequency ($f_C$–$f_S$) of the offset carrier code. Further, commanded or "target" power distribution information is supplied to the I channel majority voting module 104. As explained in the aforementioned patent documents, this power distribution information is used by the majority voting module to develop a weighted majority voting scheme in which the relative weights of the constituent codes to be combined are selected such that the power of the composite signal is effectively apportioned among the constituent codes in proportion to the power ratios indicated by the power distribution information. At each chip interval, the I channel majority vote module 104 generates a single chip value having one of two possible binary values (i.e., one of two phase states) based on the majority vote of the weighted chip values of the I channel constituent codes (including the cosine offset carrier code). Along with being in one of two possible phase states which represents a binary value, the output I channel composite signal has a nominal amplitude of unity, and some fraction of the total power of the composite signal reflects the contribution of the cosine of the offset carrier code. Again, that fraction of the total power is dictated by the commanded power distribution and is a function of the desired power levels of the particular main carrier codes signals being combined with the offset carrier codes and can vary over time.

Similarly, the Q channel majority vote module 108 receives Q channel main carrier codes to be combined with the sine offset carrier code, along with commanded or "target" power distribution information for the Q channel codes. Like the composite signal of the I channel, the composite signal of the Q channel is a constant-amplitude signal that, at each chip interval, takes on one of two possible phase states which represent a binary value determined from the weighted majority vote of the weighted chip values of the Q channel constituent codes (including the sine offset carrier code). Some fraction of the total power of the Q channel composite signal reflects the contribution of the sine of the offset carrier code, as dictated by the Q channel commanded power distribution.

The Q channel main carrier codes can, in general, be distinct from the I channel main carrier codes. Consequently, the commanded power distribution of the Q channel codes is, in general, different from the commanded power distribution of the I channel codes. As a result, the fraction of the power of the I channel composite signal that reflects the cosine carrier offset code constituent will, in general, be different from the fraction of the power of the Q channel composite signal that reflects the sine carrier offset code constituent. If this power difference between the cosine and sine of the offset carrier code is not compensated for, the second carrier offset sidelobe (e.g., $f_S+f_S$) will not, in general, be canceled in the RF composite signal, such that a single offset carrier is not achieved.

Referring again to FIG. 1, a scale factor module 110 applies a scale factor to the I channel composite signal to adjust the magnitude of the I channel composite signal relative to the Q channel composite signal. It will be appreciated that this scale factor could be applied to the Q channel instead of the I channel (or different scale factors could be applied to both) so long as the desired amplitude ratio between the I and Q channel composite signals is achieved. Such a scale factor function is not normally required in conventional implementations of majority voting logic. The scale factor is applied here to equalize the power contributions of the cosine offset carrier code (COC), which is a constituent of the I channel composite signal, and the sine offset carrier code (SOC), which is a constituent of the Q channel composite signal.

Without the scale factor function, the I and Q channels would have equal power, since the output of the I and Q channel majority vote modules would each be a unity power signal. A majority voting scheme is utilized in each of the I and Q channel majority vote modules, as described above, in order to achieve the desired power ratios among the various codes that are being voted. The output of each of the I and Q channel majority vote modules is then a signal that, at each instant of time, is either +1 or −1 (the signs corresponding to the two possible phase states), such that the total power is unity, and all of the component codes, each with power less than 1, have the desired power relationships. However, as explained above, with separate, different codes and power distributions and corresponding different weights and/or interleaving strategies in each of the I and Q channel majority vote modules to achieve the desired power ratios among the I channel codes and the Q channel codes, it is unlikely that the I and Q offset carrier components will have equal power. However, the I and Q offset carrier components must have equal power in order to achieve cancellation of the undesired sidelobe, so the scale factor module is required to achieve the "single sideband" nature of the composite signal (cancellation of the undesired sidelobe). The composite signal is a constant-envelope signal in that it consists of a Q component with two possible phase states and an I component with two possible phase states, resulting in four possible phase states, all with the same amplitude.

The following example illustrates operation of the scale factor to achieve both a constant-envelope composite signal and equal power contributions from the cosine offset carrier code in the I channel and the sine offset carrier code in the Q channel. Suppose the target power distribution for the I channel PN codes allocates one-sixth (⅙) of the I channel power to the cosine phase of the offset carrier code (COC) (with the remaining I channel codes collectively receiving five-sixths (⅚) of the I channel power), but the target power distribution for the Q channel PN codes allocates one-half (½) of the Q channel power to the sine phase of the offset carrier (SOC). In this case, to make the power of the cosine and sine phases of the offset carrier code equal, the scale factor must increase the magnitude of the I channel by a factor of three, since three times one-sixth equals one-half. At this point, the magnitude of the adjusted I channel composite signal is three times that of the Q channel composite signal. Note, however, that each of the I and Q channel composite signals remains a constant-amplitude signal, and the output signal generated by combining the I and Q modulated RF carriers remains a constant-envelope composite signal, notwithstanding the fact that the I and Q channel amplitudes are different. The fact that the transmitted signal remains a constant envelope signal can be further understood by considering the signal state constellation, in which there remain four phase states (e.g., at 0°, 90°, 180°, and 270°), but in the shape of a rectangle rather than a square (which results when the I and Q channel magnitudes are equal). Of course, the relative amplitudes of the I and Q channel composite signals can change with each change of power distribution; however, the overall composite signal can always be represented with a constant-envelope signal generated via a saturated amplifier.

To determine the appropriate scale factor, the scale factor module 110 receives at least some of the power distribution information for both the I channel codes and the Q channel codes and identifies the power ratio of the cosine offset carrier on the I channel and the sine offset carrier on the Q channel. For example, if the power distribution information consists of a set of normalized gain factors, the scale factor can be determined from the ratio of the gain factor of the cosine offset carrier on the I channel and the gain factor of the sine offset carrier on the Q channel. To conceptually illustrate the operation of the scale factor, the scale factor is shown in FIG. 1 as a separate module; however, it will be appreciated that application of a scale factor does not necessarily require a separate physical module, and this operation can be performed via any suitable hardware and/or software.

Referring once again to FIG. 1, once the scale factor has been applied to the I channel composite signal, the I channel RF carrier $f_C$ (i.e., the cosine phase of the RF carrier) is modulated by the adjusted I channel composite signal via mixer 112, and the Q channel RF carrier (i.e., the sine phase of the RF carrier $f_C$) is modulated by the Q channel composite signal via mixer 114. A combiner 116 combines the modulated I and Q channel RF carriers to produce the constant-envelope composite signal, which can be amplified and transmitted via an antenna (not shown). As used herein, the term "mixer" is not limited to an analog mixer and can include any digital or analog mixing or multiplication operation that results in the carrier being modulated by the majority vote composite signal. Likewise, any suitable mechanism can be used to combine the modulated I and Q components of the RF carrier.

Figure 2:
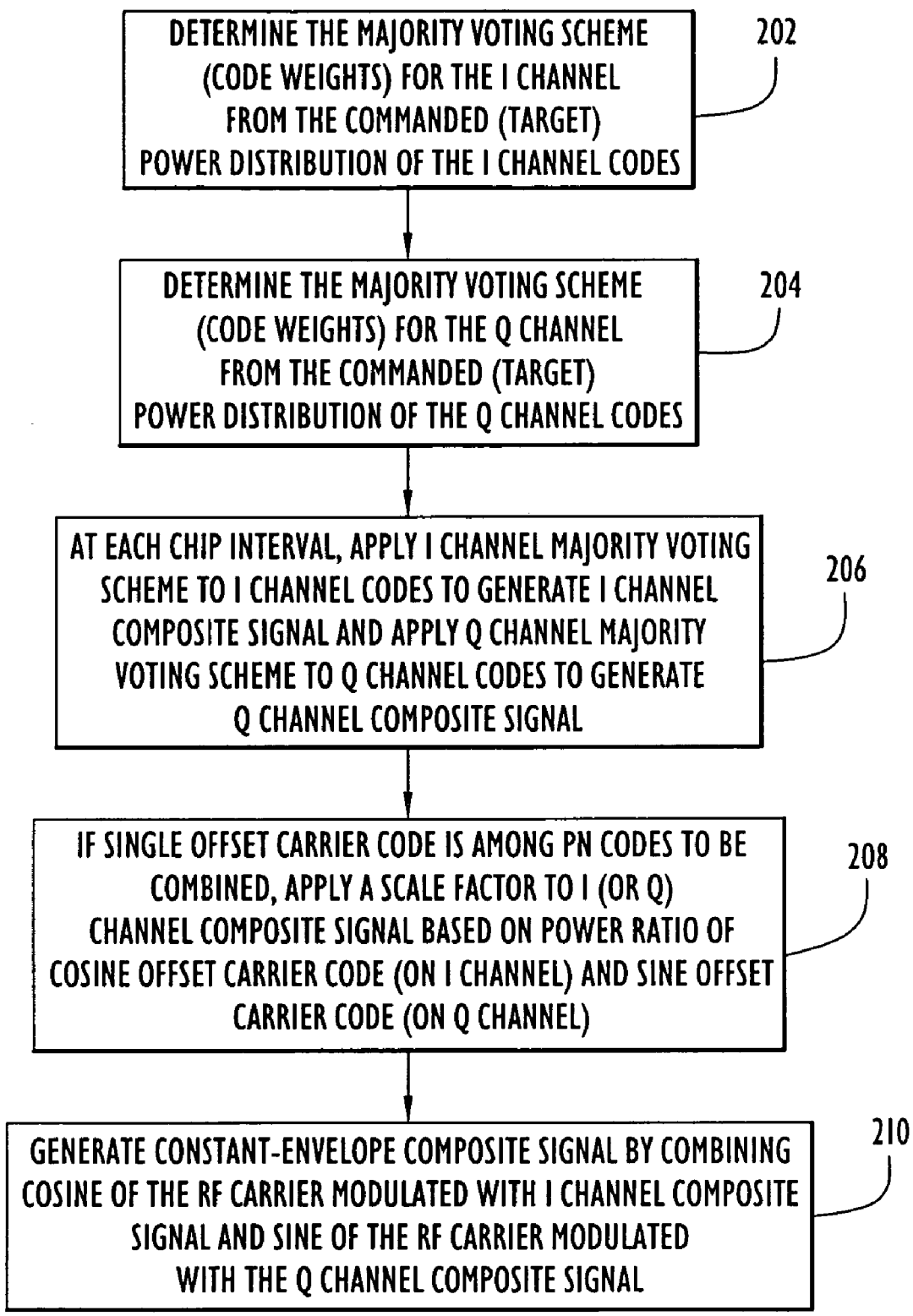
FIG. 2 is a flow diagram illustrating operations performed to generate the constant-envelope composite signal from the modulator configuration of FIG. 1.

The methodology of the MCCE technique is summarized in the flowchart shown in FIG. 2. Specifically, for each of the I and Q channels, a majority voting scheme is determined from the commanded power distribution of the codes to be combined on that channel (operations 202 and 204). Again, these power distributions can change over time as a result of observed channel conditions which require more or less power to be allocated to certain channels, but the power distribution typically remains constant over a period of time many times greater than the duration of a single chip period, such that a very large number of consecutive chip periods occur during each constant power distribution period. In operation 206, at each chip interval, each of the I and Q channels separately performs a majority vote by applying the majority voting scheme to the chip values of the codes in that channel to generate a composite signal for that channel (i.e., an I channel composite signal, and a separate Q channel composite signal).

In the case where a single offset carrier code is among the PN codes to be combined, in operation 208, a scale factor is applied to the I channel composite signal (or, equivalently, to the Q channel composite signal) based on the power ratio of the cosine offset carrier code (which is a constituent of the composite I channel signal) and the sine offset carrier code (which is a constituent of the composite Q channel signal) in order to ensure that the cosine and sine offset carrier codes have the same power. The constant-envelope composite signal is then generated by combining the cosine of the RF carrier (the I phase of the carrier) modulated with the I channel composite signal and the sine of the RF carrier (the Q phase of the carrier) modulated with the Q channel composite signal (operation 210).

As suggested by FIG. 1, the input offset carrier code can be simply a single, PN spreading code. However, as an extension of the basic MCCE concept, the offset carrier code can itself be the result of majority voting a set of PN codes with arbitrary power ratios. This results in a single constant envelope composite signal that contains a main carrier modulated by a plurality of codes combined with an offset carrier which is also modulated by a plurality of codes.

Figure 3:
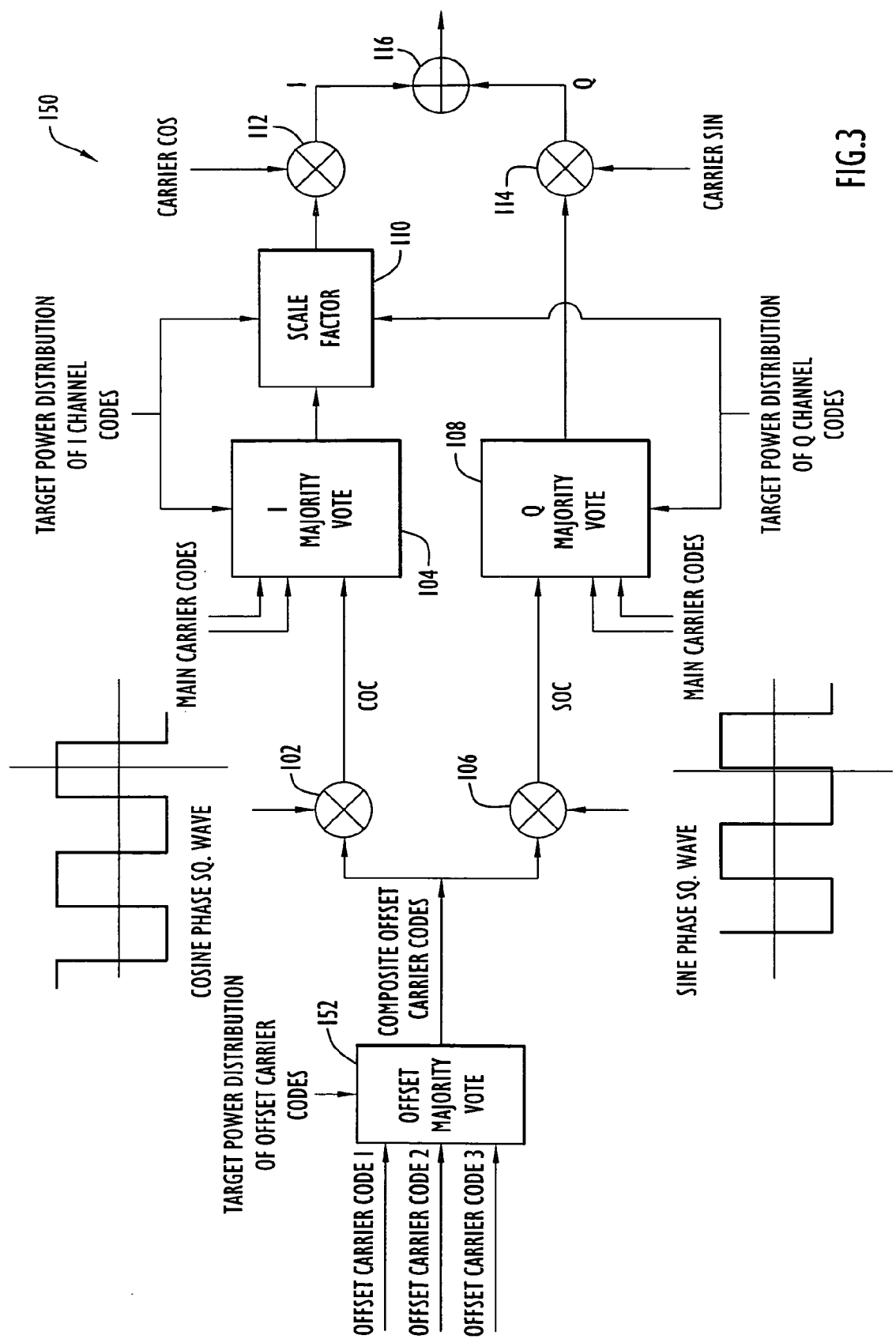
FIG. 3 is a functional block diagram of a modulation scheme for combining a plurality of offset carrier codes modulated on a single offset carrier code with main carrier codes into a constant-envelope composite signal in accordance with an exemplary embodiment of the present invention.

An example of such a modulation scheme is shown in FIG. 3. In this case, a modulator 150 is required to modulate three PN codes onto the same single offset carrier, e.g., $f_C-f_S$. Each of these three offset carrier codes is supplied to an offset majority vote module 152, which also receives the target power distribution for the offset carrier codes. At each chip interval, the offset majority vote module 152 generates a composite offset carrier code chip value based on the weighted majority voting scheme developed from the target power distribution (e.g., in the manner described in the aforementioned patent documents). The composite offset carrier code is then supplied to the downstream portion of modulator 150, which from this point is essentially the same as modulator 100 shown in FIG. 1. In other words, the composite offset carrier code is supplied to the same point in the modulator that the offset carrier code is supplied in FIG. 1.

Figure 4:
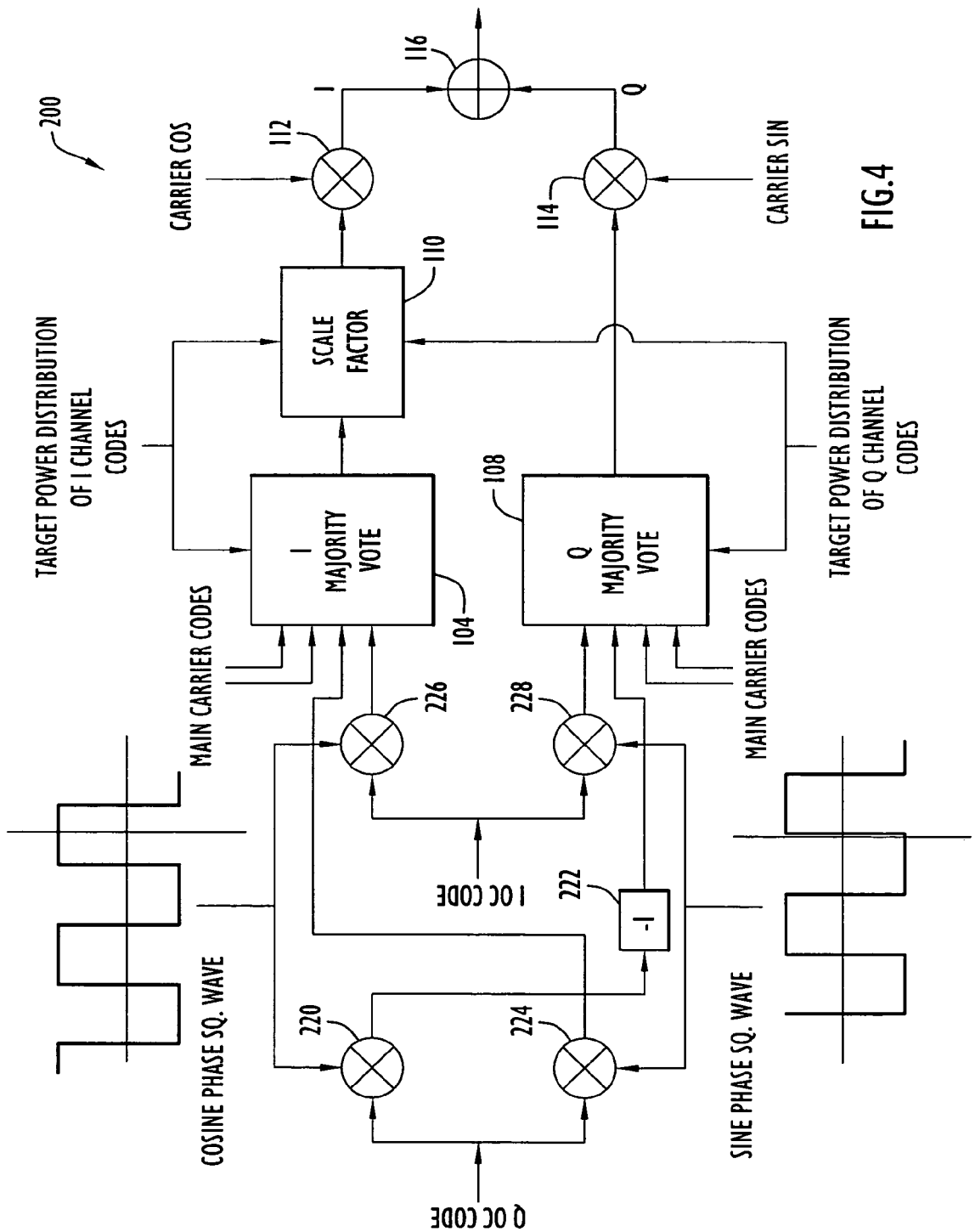
FIG. 4 is a functional block diagram of another modulation scheme for combining a plurality of offset carrier codes modulated on a single offset carrier code with main carrier codes into a constant-envelope composite signal in accordance with an exemplary embodiment of the present invention.

Another extension of the MCCE technique allows assigning individual codes or groups of codes to specific quadratures on the offset carrier. This functionality is depicted in FIG. 4 with modulator 200. Here, one PN code, designated as the I offset carrier code and labeled "I OC Code" in FIG. 4, modulates the I channel of the offset carrier, $\cos(f_c-f_s)$, while another, different PN code, designated as the Q offset carrier code and labeled "Q OC Code" in FIG. 4, modulates the Q channel of the offset carrier, $\sin(f_c-f_s)$. The I OC Code and the Q OC Code each can be individual codes (like the arrangement shown in FIG. 1) or majority votes of a group of codes (like the arrangement shown in FIG. 3).

More specifically, the Q OC code is multiplied by the cosine phase of a square wave of frequency $f_S$ via multiplier 220. The logical values of the chips of the resulting offset code are inverted by phase inverter 222 and supplied to the Q majority vote module 108. The Q OC code is also separately multiplied by the sine phase of the square wave and supplied to the I majority vote module 104. Further, the I OC code is multiplied by the cosine phase of the square wave and supplied to the I majority vote module 104. The I OC code is also separately multiplied by the sine phase of the square wave and supplied to the Q majority vote module 108. The rest of modulator 200 operates in essentially the same manner as modulator 100 shown in FIG. 1.

In effect, the scheme shown in FIG. 4 produces I and Q channels on the offset carrier, so that separate codes can be modulated onto the I and Q channels of the offset carrier. In this manner, two codes can be transmitted at the offset frequency. Note that the configurations shown in FIGS. 1 and 3 allow an odd number of codes to be transmitted on the same carrier offset frequency (i.e., one code in FIG. 1 and any odd number of codes in FIG. 3), since odd numbers of codes are generally required in majority vote schemes. The arrangement of FIG. 4 permits an even number of codes to be transmitted on the same offset carrier. The simple case of two codes is shown in FIG. 4. To combine four codes, for example, one code can be designated as the Q OC code, and the remaining three codes can be majority voted and the resulting composite signal can be designated as the I OC code. Thus, virtually any number of PN codes can be modulated onto the single offset carrier, which can then be combined with main carrier codes while still maintaining a constant-envelope composite signal.

The architectures depicted in FIGS. 1, 3, and 4 are conceptual and do not necessarily suggest specific implementations or physical relationships. For example, the modulation schemes shown therein can be implemented with any suitable analog circuitry, digital circuitry or combinations thereof, and the required signal processing can be performed via any suitable hardware, software, or combinations thereof.

As a further extension of the MCCE technique, the offset carrier generation blocks can be repeated for several different offset frequencies. In this case, the constant envelope composite signal includes a plurality of RF carriers, each with its own inphase and quadrature channels modulated by a plurality of codes, all with arbitrary power levels. Note also that the power ratios among the individual component codes can be modified in real time by adjusting parameters in the weighting/interleaving strategies of the individual majority vote modules, as described in the literature and the aforementioned patent documents, and appropriate adjustment of the scale factor. In this case, the scale factor is required to scale at least one of the I and Q channels to ensure that, for each single offset carrier frequency, the I and Q components have equal power. Note that the MCCE technique can be employed to transmit signals on a plurality of frequency channels within a designed frequency band or to transmit signals on a plurality of separate, non-contiguous frequency bands each serving as a separate frequency channel. In either case, the use of offset carriers results in generation of distinct frequencies which can serve as separate signal channels.

With the above extension, if the chipping rates of the codes are all equal and if the frequency spacing between the offset carriers is set equal to that chipping rate, each offset frequency coincides with spectral nulls of the other carriers and the resultant composite spectrum is very similar to that of OFDM. One feature of OFDM that was a major factor leading to its current popularity is that it can be easily generated using the Inverse Fast Fourier Transform (IFFT). The IFFT cannot be used to generate MCCE, but since MCCE uses square waves at the offset frequencies, rather than sinusoids, they can be easily generated with modulo counters in a digital implementation. The MCCE waveform can, therefore, be generated just as easily as OFDM. Although this implementation of MCCE is not compatible with the most widely used OFDM signal structures (where the offset carriers are being modulated by successive symbols in a single data stream), it is compatible with a version of Multi-Carrier CDMA (an OFDM variant) that assigns a separate CDMA signal to each of the orthogonal carriers. The use of MCCE to generate this MC CDMA signal structure results in a constant envelope signal (allowing the use of inexpensive, highly efficient saturated amplifiers) and allows the accommodation of many simultaneous users, since each individual CDMA signal can be the majority vote of many component codes (greatly improving the bandwidth efficiency of the modulation technique).

The foregoing examples involve combining at least one single offset carrier code with other, main carrier codes, which in turn requires use of a scale factor to equalize the power of the I and Q channel versions of the offset carrier code. However, the applicability of the MCCE technique of the present invention is not limited to modulation schemes involving offset carrier codes. More generally, the MCCE technique can be applied in any context where majority voting logic can be separately applied to codes being combined on the I channel and codes being combined on the Q channel. In the absence of single offset carrier codes, the scale factor, in general, is not required. The use one majority vote function for I channel codes and another, independent majority vote function for the Q channel codes may provide advantages in a number of other contexts. For example, as described in the aforementioned patent documents, certain PN codes are more easily combined with each other than others. A simpler majority voting scheme can be employed where the relative powers of the codes being combined are not drastically different. By grouping PN codes into subsets based on ease of combining, and by applying separate majority votes to the subsets on the I and Q channels, respectively, the MCCE technique can reduce the complexity of the majority voting logic scheme employed in each of the I and Q channels and potentially yield accurate power distributions with simpler majority voting logic schemes. Thus, in a general case, the MCCE technique of the present invention requires separate I and Q channel majority vote functions which produce constant-amplitude I and Q channel composite signals that combine to produce a constant-envelope composite RF signal for transmission.

As will be apparent from the foregoing description, the MCCE technique has wide applicability in terrestrial, airborne, and satellite communication and navigation systems involving simultaneous transmission of plural signals and may be of particular benefit in satellite navigation systems such as GPS and Galileo, CDMA-based communications such as those used in cell-based wireless telephony, and emerging WiFi and WiMAX communication technologies.

Having described exemplary embodiments of a multi-carrier constant envelope signal scheme for power and bandwidth efficient communications, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. A method of combining a plurality of signals to form a constant-envelope composite signal in a modulator, comprising:
   (a) generating a constant-amplitude inphase (I) composite signal based on a majority vote of a first plurality of signals;
   (b) generating a constant-amplitude quadrature (Q) composite signal based on a majority vote of a second plurality of signals, wherein at least one offset carrier code is among the first and second pluralities of signals to be combined in the constant-envelope composite signal;
   (c) applying a scale factor to at least one of the I and Q composite signals to equalize a power of an offset carrier code among the first plurality of signals combined into the I composite signal and a power of an offset carrier code among the second plurality of signals combined into the Q composite signal such that a single offset carrier code is contained within the constant-envelope composite signal;
   (d) modulating, in the modulator, an inphase (I) component of a carrier signal with the I composite signal;
   (e) modulating, in the modulator, a quadrature (Q) component of the carrier signal with the Q composite signal; and
   (f) combining the modulated I and Q components of the carrier signal to form the constant-envelope composite signal.

2. The method of claim 1, wherein:
   (a) includes performing the majority vote with values of the first plurality of signals that are weighted in accordance with a power allocation associated with the first plurality of signals; and
   (b) includes performing the majority vote with values of the second plurality of signals that are weighted in accordance with a power allocation associated with the second plurality of signals.

3. The method of claim 1, wherein the constant-envelope composite signal is a multi-carrier constant envelope signal.

4. The method of claim 1, wherein the scale factor causes amplitudes of the I and Q channel composite signals to differ.

5. The method of claim 1, wherein the at least one offset carrier code comprises a composite offset carrier code generated by combining a plurality of offset carrier codes via a majority vote.

6. The method of claim 1, wherein the single offset carrier contained in the constant envelope composite signal is modulated by first and second offset carrier codes at orthogonal phases.

7. The method of claim 6, wherein a cosine phase of a square wave modulated by the first offset carrier code and a sine phase of the square wave modulated by the second offset carrier code are among the signals combined in the I composite signal; and
   the cosine phase of the square wave modulated by the second offset carrier code and the sine phase of the square wave modulated by the first offset carrier code are among the signals combined in the Q composite signal.

8. The method of claim 6, wherein at least one of the first and second offset carrier codes comprises a composite offset carrier code generated by combining a plurality of offset carrier codes via a majority vote.

9. The method of claim 1, wherein (a) includes combining a plurality of offset carrier codes at a plurality of offset carrier frequencies with first other codes; and (b) includes combining a plurality of offset carrier codes at the plurality of offset carrier frequencies with second other codes.

10. The method of claim 1, wherein the first and second pluralities of signals comprise chip-synchronous, pseudo-noise signal codes, and wherein values of the I and Q composite signals are determined on a chip-by-chip basis from weighted majority votes of the first and second pluralities of signals, respectively.

11. The method of claim 1, wherein the first and second pluralities of signals are Code Division Multiple Access (CDMA) data streams.

12. The method of claim 10, wherein the first and second pluralities of signals are transmitted as a multi-carrier CDMA signal.

13. A method of combining at least one single offset carrier code with a plurality of main carrier codes into a multi-carrier constant-envelope (MCCL) composite signal in a modulator, the method comprising:
   (a) generating a constant-amplitude inphase (I) composite signal based on a majority vote of a first plurality of main carrier codes and a first phase of an offset carrier code;

(b) generating a constant-amplitude quadrature (Q) composite signal based on a majority vote of a second plurality of main carrier codes and a second phase of the offset carrier code;

(c) adjusting an amplitude of at least one of the I and Q composite signals to equalize a power of the first phase of the offset carrier code and a power of the second phase of the offset carrier code;

(d) modulating, in a modulator, an inphase (I) component of a carrier signal with the I composite signal;

(e) modulating, in a modulator, a quadrature (Q) component of the carrier signal with the Q composite signal; and (f) combining the modulated I and Q carrier signals to form the multi-carrier constant-envelope composite signal containing the first and second main carrier codes and a single offset carrier code resulting from contributions from the first and second phases of the offset carrier code.

14. An apparatus for combining a plurality of signals to form a constant-envelope composite signal, comprising:

an inphase (I) majority vote module operable to generate a constant-amplitude inphase (I) composite signal based on a majority vote of a first plurality of signals;

a quadrature (Q) majority vote module operable to generate a constant-amplitude quadrature (Q) composite signal based on a majority vote of a second plurality of signals, wherein at least one offset carrier code is among the first and second pluralities of signals to be combined in the constant-envelope composite signal;

a scale factor module for applying a scale factor to at least one of the I and Q composite signals to equalize a power of an offset carrier code among the first plurality of signals combined into the I composite signal and a power of an offset carrier code among the second plurality of signals combined into the Q composite signal such that a single offset carrier code is contained within the constant-envelope composite signal;

an I channel mixer for modulating an inphase (I) component of a carrier signal with the I composite signal;

a Q channel mixer for modulating a quadrature (Q) component of the carrier signal with the Q composite signal; and a combiner for combining the modulated I and Q components of the carrier signal to form the constant-envelope composite signal.

15. The apparatus of claim 14, wherein the apparatus is a base station in a communication network.

16. The apparatus of claim 15, wherein the base station is in a terrestrial cellular network.

17. The apparatus of claim 14, wherein the apparatus is a mobile communication device.

18. The apparatus of claim 14, wherein the apparatus is a satellite.

19. The apparatus of claim 14, wherein the apparatus is a WiFi or WiMAX transmitter.

20. The apparatus of claim 14, wherein the apparatus is a Code Division Multiple Access (CDMA) transmitter.

21. The apparatus of claim 14, wherein the apparatus is a multi-carrier CDMA transmitter.

22. An apparatus for combining a plurality of signals to form a constant-envelope composite signal, comprising:

an inphase (I) majority vote module operable to generate a constant-amplitude inphase (I) composite signal based on a majority vote of a first plurality of signals, wherein the I majority vote module performs the majority vote with values of the first plurality of signals that are weighted in accordance with a power allocation associated with the first plurality of signals;

a quadrature (Q) majority vote module operable to generate a constant-amplitude quadrature (Q) composite signal based on a majority vote of a second plurality of signals, wherein the Q majority vote module performs the majority vote with values of the second plurality of signals that are weighted in accordance with a power allocation associated with the second plurality of signals;

an I channel mixer for modulating an inphase (I) component of a carrier signal with the I composite signal;

a Q channel mixer for modulating a quadrature (Q) component of the carrier signal with the Q composite signal; and a combiner for combining the modulated I and Q components of the carrier signal to form the constant-envelope composite signal.

23. The apparatus of claim 14, wherein the scale factor causes amplitudes of the I and Q channel composite signals to differ.

24. The apparatus of claim 14, further comprising an offset majority vote module operable to generate a composite offset carrier code by combining a plurality of offset carrier codes via a majority vote, wherein phases of a square wave modulated by the composite offset carrier code are supplied to the I and Q majority vote modules, respectively.

25. The apparatus of claim 14, wherein the single offset carrier contained in the constant envelope composite signal is modulated by first and second offset carrier codes at orthogonal phases.

26. The apparatus of claim 25, wherein a cosine phase of a square wave modulated by the first offset carrier code and a sine phase of the square wave modulated by the second offset carrier code are among the signals combined by the I majority vote module; and the cosine phase of the square wave modulated by the second offset carrier code and the sine phase of the square wave modulated by the first offset carrier code are among the signals combined by the Q majority vote module.

27. The apparatus of claim 25, wherein at least one of the first and second offset carrier codes comprises a composite offset carrier code generated by combining a plurality of offset carrier codes via a majority vote.

28. The apparatus of claim 14, wherein the I majority vote module combines a plurality of offset carrier codes at a plurality of offset carrier frequencies with first other codes, and the Q majority vote module combines a plurality of offset carrier codes at the plurality of offset carrier frequencies with second other codes.

29. The apparatus of claim 14, wherein the first and second pluralities of signals comprise chip-synchronous, pseudo-noise signal codes, and wherein the I and Q majority vote modules respectively determine values of the I and Q composite signals on a chip-by-chip basis from weighted majority votes of the first and second pluralities of signals.

30. The apparatus of claim 14, wherein apparatus generates a multi-carrier constant-envelope composite signal.

* * * * *

UNITED STATES PATENT AND TRADEMARK OFFICE
CERTIFICATE OF CORRECTION

PATENT NO. : 7,616,678 B2  Page 1 of 1
APPLICATION NO. : 11/449856
DATED : November 10, 2009
INVENTOR(S) : Gene L. Cangiani et al.

It is certified that error appears in the above-identified patent and that said Letters Patent is hereby corrected as shown below:

Column 12, line 63, replace "(MCCL) composite signal" with -- (MCCE) composite signal --.

Signed and Sealed this

Nineteenth Day of January, 2010

David J. Kappos
*Director of the United States Patent and Trademark Office*